March 29, 1938.   R. HARDING, JR   2,112,528
TELEVISION RECEIVER
Filed March 12, 1934
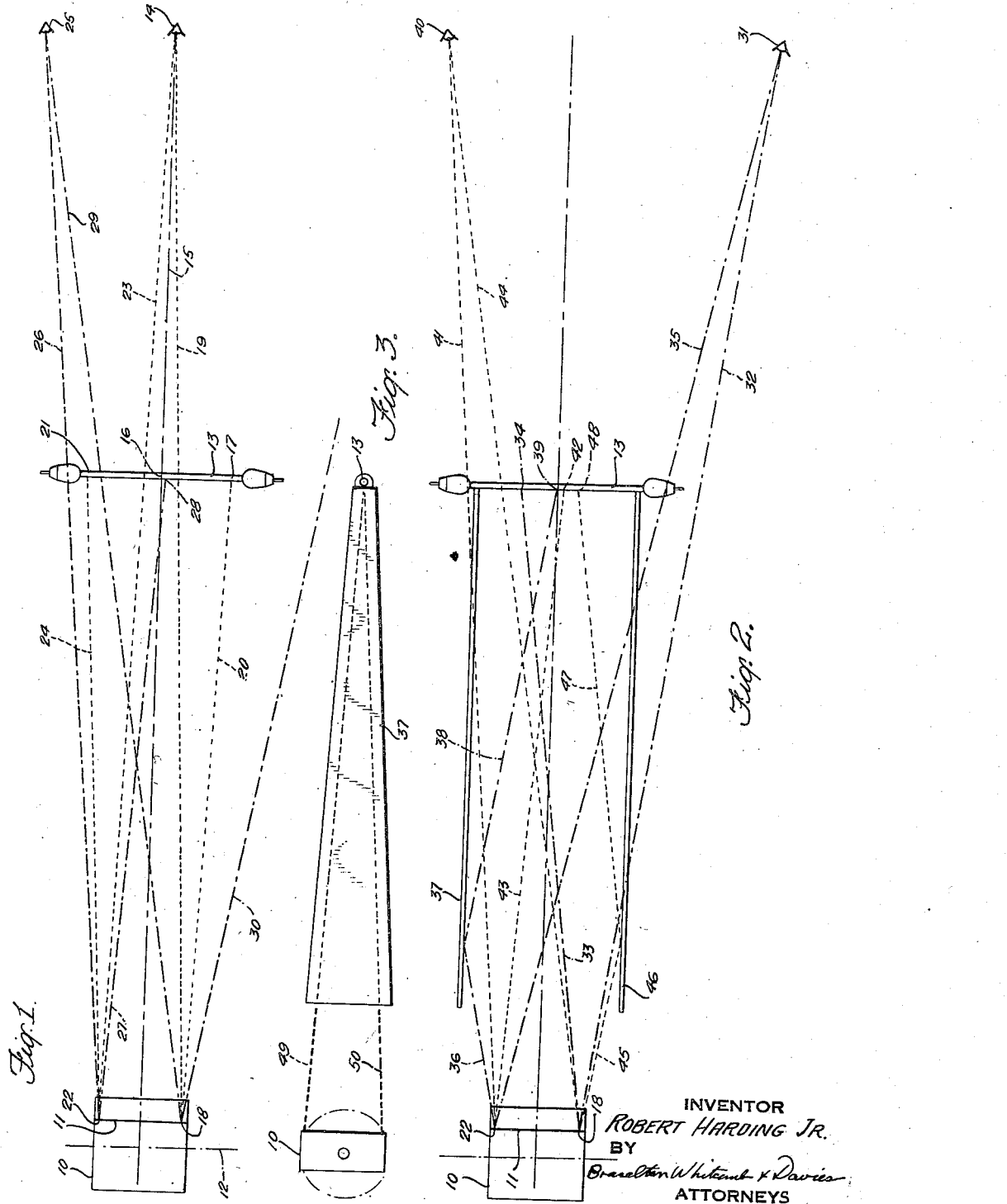

Patented Mar. 29, 1938

2,112,528

UNITED STATES PATENT OFFICE 2,112,528

TELEVISION RECEIVER

Robert Harding, Jr., Elmsford, N. Y., assignor to National Television Corporation, Wilmington, Del., a corporation of Delaware Application March 12, 1934, Serial No. 715,053

8 Claims. (Cl. 178—7.3)

This invention relates to television receivers and particularly to that type of receiver using a helical mirror drum and has for its principal object to increase the vertical angle of observation.

Another object of the invention is to permit the use of a shorter light source with the subjective use of a helical mirror drum.

Other objects and objects relating to means and methods of constructing the various parts will be apparent as the description of the invention proceeds.

One embodiment of the invention has been illustrated in the accompanying drawing in which:

Fig. 1 is a diagrammatical elevational view of a receiver without the present invention;

Fig. 2 is a similar view of a receiver with the invention applied; and

Fig. 3 is a plan view of the construction shown in Fig. 2.

In the patent to Gardner No. 1,753,697 a plurality of rectangular plates are placed one on top of the other on a suitable retaining shaft and spaced angularly with respect to each other so as to form a helix around the shaft. One edge of each of these plates is made reflecting while the opposite edge and ends are blackened to prevent any reflection of light. One highly successful manner of using this drum to create a television picture is to position a linear source of light at a suitable distance away from the drum and parallel with the axis thereof and observe the image of the light in the reflecting surfaces as the drum rotates. A portion of the light source is seen in one plate at a time and the observed image is caused to move from one side of the drum to the other as the drum rotates and if the light is being modulated by a television signal the result will be a picture on the surface of the drum.

In Fig. 1 I have shown an elevation of a similar drum 10 with all of the surfaces lined up together forming a straight flat surface 11, this arrangement being only for the purpose of illustration as these surfaces are stepped in angular relation around the drum as already explained. However the principle involved in the present invention may be demonstrated without reference to the angular displacement of the plates. The drum is mounted for rotation about the axis 12.

A light source 13 is positioned away from the drum 10 and may comprise a tubular lamp similar to that shown and described in the Patent No. 2,089,806 to John W. McKay. The tubular portion of this lamp lights up and modulates uniformly in accordance with the signal impressed thereon. In observing the drum the observer stands slightly to one side of the lamp so that the lamp does not obstruct his view, but for purposes of illustration the lamp and the eye of the observer have been shown in the same vertical plane.

With his eye positioned at 14 the observer looks at the center plate of the drum along the dot and dash line 15 and sees the reflection of a point 16 of the lamp in this center plate also along the line 15. His eye picks up the reflection of a point 17 of the lamp in the lowermost plate 18 of the drum along a dotted line 19 between his eye and the drum and a dotted line 20 between the drum and the lamp. In a similar manner the observer sees the reflection of a point 21 of the lamp in the uppermost plate 22 along the dotted line 23 between his eye and the drum and the dotted line 24 between the drum and the lamp. He will then see a complete picture with the top and bottom thereof included.

If the observer now moves his eye vertically assuming a position indicated at 25 he will then see in the uppermost plate along a dot and dash line 26 from his eye to the drum and a dot and dash line 27 from the drum to the lamp, the portion 28 of the lamp, which, it will be noted, is slightly below the center. If he looks at the lowermost plate 18 of the drum however he will see no portion of the light inasmuch as his gaze traverses the dot and dash line 29 to the drum and the dot and dash line 30 away from the drum. As this line does not strike the lamp, that portion of the drum will appear black, as will several of the plates above it so that the bottom part of the picture is cut off as the observer raises his head. In a similar manner the upper portion of the picture will be cut off when the observer lowers his head.

One obvious method of overcoming this difficulty and increasing the vertical angle of observation is to increase the length of the light source. This however is not always expedient and may necessitate greater current consumption as well as occupying more space in the cabinet which may be a serious objection. I have found that by placing two mirrors parallel to each other and perpendicular to the line of light and to the axis of the drum, and spaced at least as far apart as the uppermost and lowermost plates are spaced, I can obtain a very great increase in the vertical angle of observation so that the child sitting on the floor below the drum can see the picture by looking up at it as well as the tall man standing near the drum and looking down at it.

Figs. 2 and 3 illustrate the manner of carrying out the invention. The same light source 13 is positioned from the drum 10 in a similar manner to Fig. 1 and the lowermost and uppermost points 18 and 22 on the drum are the same as for the other figure. If the observer lowers his head so that his eye is in a position 31 his line of observation for the lowermost plate is represented by the dot and dash line 32 which strikes the lowermost plate 18 and is redirected along the dot and dash line 33 to the point 34 on the lamp. His line of observation to the uppermost plate follows the dot and dash line 35, is redirected along the dot and dash line 36 until it strikes the surface of the mirror 37 which extends from the upper end of the light 13 to a point near the drum and lies in a plane perpendicular to the light source and to the axis of the drum. From this mirror the line of observation is reflected along the line 38 to a point 39 on the light source. The observer with his eye at 31 will therefor see both the lower and upper part of the picture, the latter due to the mirror 37.

Let us assume that the observer raises his head till his eye is in the position indicated at 40. The uppermost plate 22 of the picture will be observed along the dotted line 41, a point 42 of the light source being picked up along the line 43. The line of observation of the lowermost plate is indicated by the dotted line 44 which is reflected from the lowermost plate 18 along the dotted line 45 which strikes the lower mirror 46. This mirror is similar to the mirror 37 and is parallel to it extending from the lamp to a point near the drum. The line of observation 45 is reflected along the dotted line 47 where it picks up the point 48 on the light.

The ends of the mirrors 47 and 46 nearest to the drum may be made just a trifle wider than the angle of light rays from the lamp to the side edges of the drum as indicated by the dotted lines 49 and 50 of Fig. 3, while the end of the mirrors near the light may be made large enough to extend slightly beyond the lines on both sides. The mirrors may be positioned closer together than shown in Fig. 2 but the distances between them must not be less than the distance between the plates 18 and 22. They may also, of course, be positioned farther away from each other than is shown but in no case should their distances apart be greater than the length of the light source. The length of the mirrors or the distance between their ends and the drum is determined by the angle of observation desired and the nearer the ends are to the drum the greater will be the angle of observation. However, for practical purposes it may be found necessary to use mirrors of only half the length shown in order to get a sufficient angle.

While two mirrors have been shown it is obvious that it may be desirable to use only one in which case the range of vision will be centered towards the opposite end of the lamp from the mirror. In this case if desired the lamp may be positioned so that the end at which the mirror is positioned may come even with the end of the drum while the other end of the lamp extends beyond the other end of the drum. Any suitable types of mirrors may be used, ordinary glass mirrors being sufficient and the main requirement is that the mirror be positioned perpendicular to the light source and that it extend near enough to the light source so that there will be no gap between the mirror and the light source.

Many modifications of the invention may be resorted to without departing from the spirit thereof and I do not therefore desire to limit myself to what has been shown and described except as such limitations occur in the appended claims.

What I claim is:

1. A television receiver comprising a plurality of relatively long narrow reflecting surfaces arranged side by side in a helix around an axis and adapted to rotate about said axis, a linear source of light spaced from said reflecting surface and having a length at least equal to the combined width of said surfaces measured along said axis, and means spaced from said reflecting surfaces and substantially perpendicular to the axis of said source to optically extend the length of said linear source of light.

2. A television receiver comprising a mirror drum having a plurality of relatively long narrow reflecting surfaces arranged side by side in a helix around the axis of the drum, a linear light source spaced from said drum and parallel to the axis thereof, and a mirror extending from said light source towards said drum, said mirror lying in a plane perpendicular to said light source and outside of a line drawn perpendicular to the axis of the drum through one of the end surfaces thereof.

3. A television receiving apparatus comprising a drum having a plurality of relatively long narrow reflecting surfaces arranged side by side in a helix around the axis of the drum, a linear source of light spaced from said drum and parallel to the axis thereof, and a mirror extending from said light source towards said drum, said mirror lying in a plane perpendicular to said light source and outside of planes perpendicular to the axis of said drum and including the end reflecting surfaces, the reflecting surface of said mirror being towards said last mentioned planes.

4. A television receiver comprising a drum having a plurality of relatively long narrow reflecting surfaces arranged side by side in a helix around the axis of said drum, a linear source of light positioned parallel to the axis of said drum and spaced therefrom, and a pair of mirrors arranged parallel to each other and perpendicular to said light source with the reflecting surfaces towards each other, said mirrors extending from said light source to a point adjacent said drum and being spaced apart a distance equal at least to the axial length of said drum.

5. A television receiver comprising a plurality of relatively long narrow reflecting surfaces arranged side by side in a helix around an axis and adapted to rotate about said axis, a linear source of light spaced from said reflecting surfaces and having a length at least equal to the combined width of said surfaces measured along said axis, and means outside of the direct path between said source and said surfaces and substantially perpendicular to the axis of said source to optically extend the length of said source.

6. A television receiver comprising a mirror drum having a plurality of relatively long narrow reflecting surfaces arranged side by side in a helix around the axis of the drum, a linear light source spaced from said drum and parallel to the axis thereof, and a flat mirror extending from said light source towards said drum, said mirror lying in a plane perpendicular to said light source and outside of a line drawn perpendicular to the axis of the drum through one of the end surfaces thereof.

7. A television receiving apparatus comprising a drum having a plurality of relatively long narrow reflecting surfaces arranged side by side in a helix around the axis of the drum, a linear source of light spaced from said drum and parallel to the axis thereof, and a flat mirror extending from said light source towards said drum, said mirror lying in a plane perpendicular to said light source and outside of planes perpendicular to the axis of said drum and including the end reflecting surfaces, the reflecting surface of said mirror being towards said last mentioned planes.

8. A television receiver comprising a drum having a plurality of relatively long narrow reflecting surfaces arranged side by side in a helix around the axis of said drum, a linear source of light positioned parallel to the axis of said drum and spaced therefrom, and a pair of flat mirrors arranged parallel to each other and perpendicular to said light source with the reflecting surfaces towards each other, said mirrors extending from said light source to a point adjacent said drum and being spaced apart a distance equal at least to the axial length of said drum.

ROBERT HARDING, Jr.